(12) United States Patent
Nevison

(10) Patent No.: US 10,954,068 B2
(45) Date of Patent: Mar. 23, 2021

(54) PACKAGE RECEIVING SYSTEM AND METHOD OF USE

(71) Applicant: Martin Andrew Nevison, Arlington, TX (US)

(72) Inventor: Martin Andrew Nevison, Arlington, TX (US)

( * ) Notice: Subject to any disclaimer, the term of this patent is extended or adjusted under 35 U.S.C. 154(b) by 124 days.

(21) Appl. No.: 16/271,864

(22) Filed: Feb. 10, 2019

(65) Prior Publication Data
US 2019/0248582 A1 Aug. 15, 2019

Related U.S. Application Data

(60) Provisional application No. 62/628,989, filed on Feb. 10, 2018.

(51) Int. Cl.
| | |
|---|---|
| *B65G 1/137* | (2006.01) |
| *G05B 15/02* | (2006.01) |
| *A47G 29/30* | (2006.01) |
| *A47G 29/16* | (2006.01) |
| *A47G 29/20* | (2006.01) |
| *A47G 29/14* | (2006.01) |

(52) U.S. Cl.
CPC .......... *B65G 1/1376* (2013.01); *A47G 29/16* (2013.01); *A47G 29/20* (2013.01); *A47G 29/30* (2013.01); *G05B 15/02* (2013.01); *A47G 2029/145* (2013.01); *B65G 2201/0285* (2013.01)

(58) Field of Classification Search
CPC ............ A47G 29/12095; A47G 29/141; A47G 29/16; A47G 29/20; A47G 2029/1257; A47G 2029/144; A47G 2029/145; A47G 2029/148; A47G 2029/149; A47G 29/30; B65G 1/1376; G05B 15/02; B25G 2201/0285
USPC ...... 232/17, 19, 38, 44, 45, 43.1, 43.3, 43.4, 232/43.5; 193/8; 700/230; 414/278; 340/569; 220/908.3
See application file for complete search history.

(56) References Cited

U.S. PATENT DOCUMENTS

| | | | | |
|---|---|---|---|---|
| 2,428,509 | A * | 10/1947 | Baker | A47G 29/12 232/19 |
| 3,204,740 | A * | 9/1965 | Legault | B65F 1/10 193/34 |
| 3,279,685 | A * | 10/1966 | Price Lew P | B65F 1/0093 232/43.2 |
| 3,615,050 | A * | 10/1971 | Leipelt et al. | E05G 7/001 232/43.3 |
| 5,772,112 | A * | 6/1998 | Bulcroft | B65F 1/0093 232/44 |
| 5,774,053 | A * | 6/1998 | Porter | G07F 17/12 340/568.1 |
| 6,415,552 | B1 * | 7/2002 | Khosropour | A47G 29/141 232/1 E |

(Continued)

*Primary Examiner* — William L Miller

(57) ABSTRACT

A package receiving system includes a shoot extending through a wall of a building from an exterior of the building to an interior of the building; a first door positioned on the exterior of the building providing access to the shoot; a second door positioned on the interior of the building and providing access to the interior of the building; and a conveyer belt positioned at a bottom of the shoot to transport a package from the exterior to the interior; the second door is to open to allow the package to enter into the interior.

6 Claims, 8 Drawing Sheets

(56) References Cited

U.S. PATENT DOCUMENTS

| | | | | |
|---|---|---|---|---|
| 6,484,531 | B1* | 11/2002 | Hambleton | A47G 29/141 312/286 |
| 6,920,835 | B1* | 7/2005 | Johnson | E05G 7/001 109/59 R |
| 7,175,070 | B1* | 2/2007 | Brisport | B65F 1/10 220/908.3 |
| 8,523,050 | B1* | 9/2013 | Andreozzi | A47G 29/141 232/43.3 |
| 10,588,440 | B1* | 3/2020 | Kajgana | A47G 29/28 |
| 2002/0035857 | A1* | 3/2002 | Stein | A47G 29/141 70/277 |
| 2002/0087375 | A1* | 7/2002 | Griffin | G06Q 20/12 705/336 |
| 2003/0006275 | A1* | 1/2003 | Gray | A47G 29/141 232/19 |
| 2004/0080414 | A1* | 4/2004 | Darty | G01N 1/2202 340/540 |
| 2004/0133304 | A1* | 7/2004 | Fobbe | G07C 9/33 700/214 |
| 2006/0179724 | A1* | 8/2006 | Lee | E04H 3/02 52/79.1 |
| 2009/0166403 | A1* | 7/2009 | Volpe | G07C 9/33 235/375 |
| 2017/0124510 | A1* | 5/2017 | Caterino | G07C 9/00896 |
| 2019/0000255 | A1* | 1/2019 | Dehner | E05B 47/023 |
| 2019/0167025 | A1* | 6/2019 | Cherry | A47G 29/16 |
| 2019/0231106 | A1* | 8/2019 | Kaiserman | F25D 13/04 |
| 2019/0300202 | A1* | 10/2019 | High | G05B 15/02 |

\* cited by examiner

PACKAGE RECEIVING SYSTEM AND METHOD OF USE

BACKGROUND

1. Field of the Invention

The present invention relates generally to package and mail delivery systems, and more specifically, to a package receiving system for package protection and theft prevention.

2. Description of Related Art

Package and mail receiving systems are well known in the art and are effective means to receive deliveries. For example, FIG. 1 depicts a conventional system 101 having a mailbox 103 for receiving mail 105 therein. During use, mail is commonly left for long periods of time within the mailbox until retrieved by the resident. Further, it is conventional for larger packages to be left on porches or next to doors.

One of the problems commonly associated with system 101 and other conventional package receiving methods is security. For example, packages can be exposed to the elements, such as rain if left on the porch. Further, mail and packages are vulnerable to being stolen.

Accordingly, although great strides have been made in the area of package receiving systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
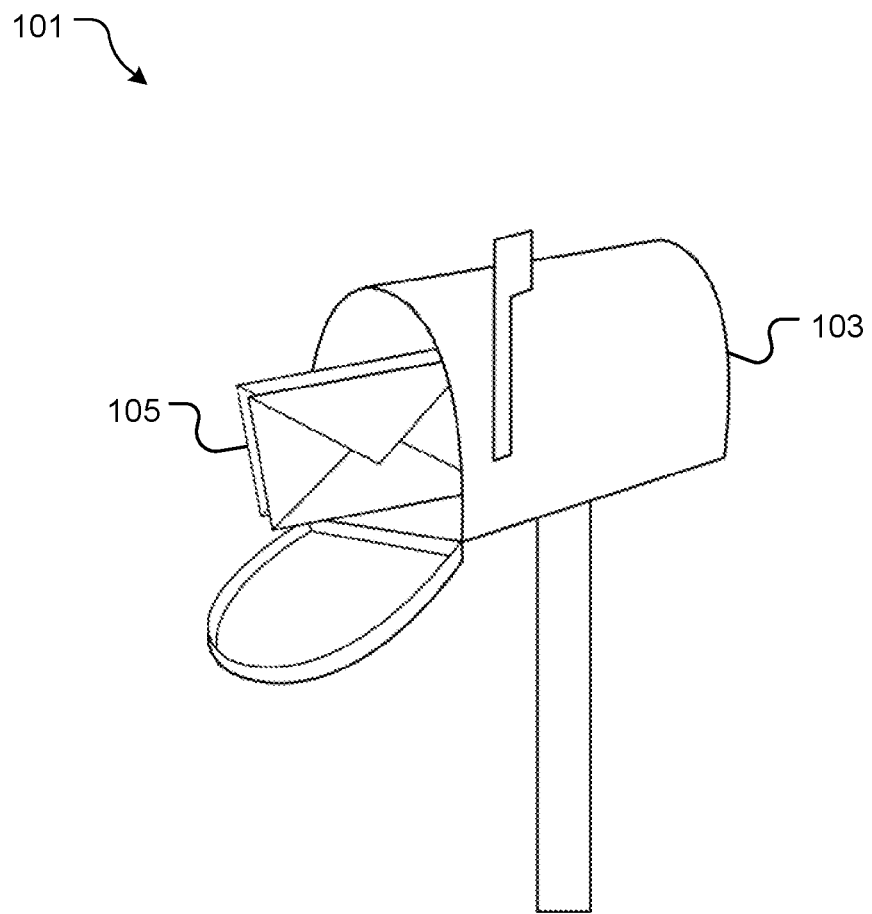
FIG. 1 is a simplified oblique view of a common mail receiving system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional package receiving systems. Specifically, the present invention provides a means to secure packages and mail from outdoor elements and potential theft. In addition, the present invention provides a means for users to receive notifications regarding the delivery of a package via means such as but not limited to notifications via a mobile device and mobile applicaiton. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
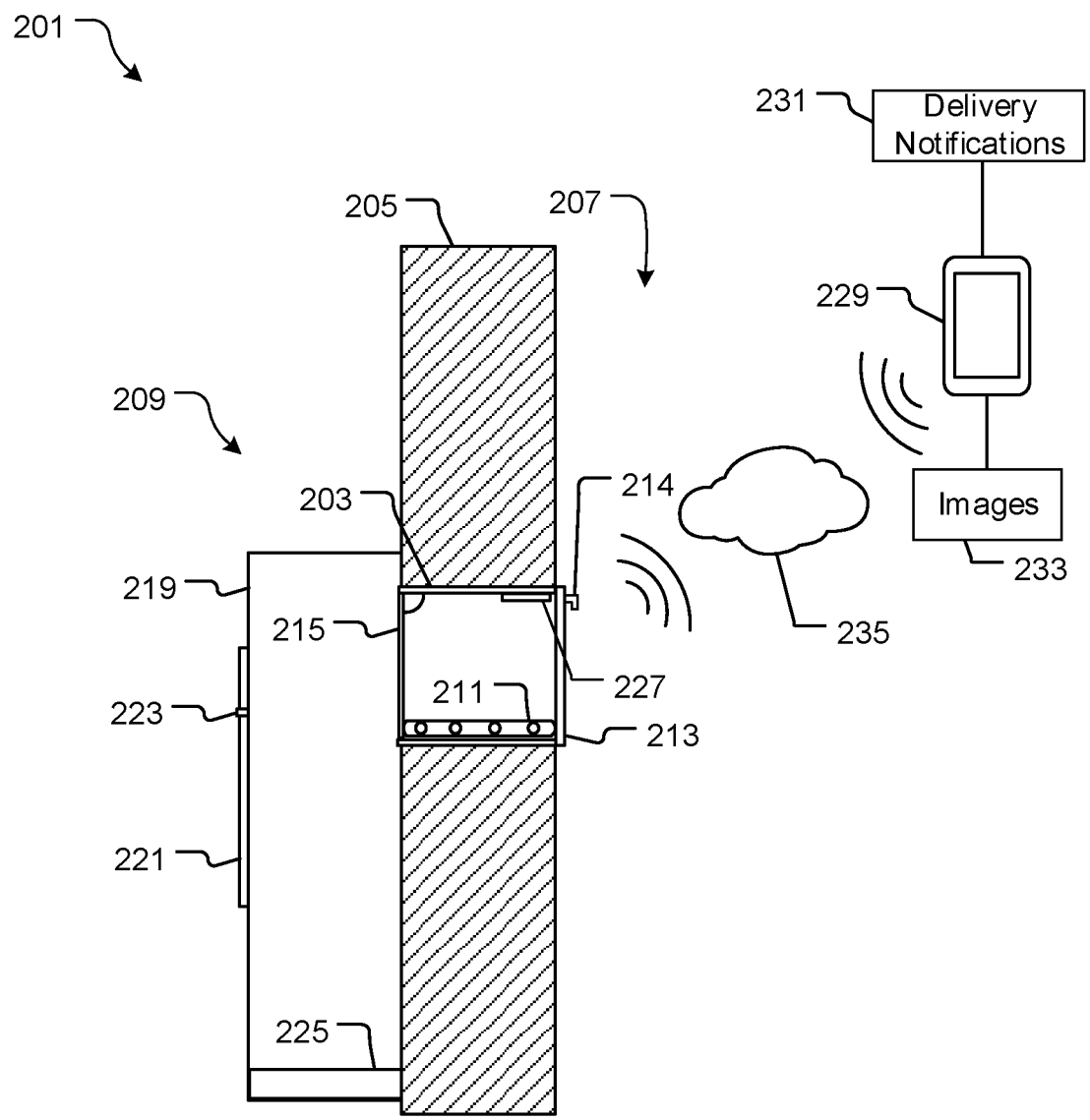
FIG. 2 is a side view of a package receiving system in accordance with a preferred embodiment of the present application.

Referring now to the drawings wherein like reference characters identify corresponding or similar elements throughout the several views, FIG. 2 depicts a side view of a package receiving system in accordance with a preferred embodiment of the present application. It will be appreciated that system 201 overcomes one or more of the above-listed problems commonly associated with conventional package delivery systems.

In the contemplated embodiment, system 201 includes a shoot 203 extending through a wall 205 of a building, thereby leading from an exterior 207 to an interior 209 of the building. It should be appreciated that the shoot can vary in size as necessary based on existing and future constructions of buildings.

Shoot 203 further includes a conveyer belt 211 positioned at the bottom of the shoot and configured to transport a package from a first door 213 to a second door 215. As shown, the first door 213 is positioned on the exterior of wall 205 and can include a handle 214, wherein delivery personnel can either open the door 213 or can insert mail through a slot of the door. It should be appreciated that in some embodiment, a slot is not included.

In the preferred embodiment, second door 215 leads into a cabinet 219 positioned in the interior 209 of the building. However, it is contemplated that the cabinet does not have to be included in all embodiments. Cabinet 219 can include an access door 221 with or without a lock 223, thereby providing the receiving party access to the interior of the cabinet. In addition, a pad 225 can be positioned at the bottom of the cabinet to protect packages as they drop from the conveyer belt 211.

In the preferred embodiment, door 215 is configured to remain closed at any time that door 213 is opened. It should be appreciated that this functionality can be achieved via a mechanical means connecting the doors together, or alternatively, via one or more sensors configured to indicate when door 213 is open. It should further be appreciated that the necessary electrical components, such as power sources are included in system 201 for functionality.

System 201 can further include an electrical control system 227 configured to wirelessly communicate with an electronic device 229, wherein information such as delivery notices 231 and images 233 are transferred to the electronic device via a wireless network 235, thereby providing a means to remotely monitor deliveries. In the preferred embodiment, a scanner is incorporated into control system 227, wherein the scanner is activated upon opening of door 213, thereby providing a means to scan a code associated with the package. One embodiment, includes an RFID scanner, however, other forms of scanners could be used.

Figures 3A, 3B:
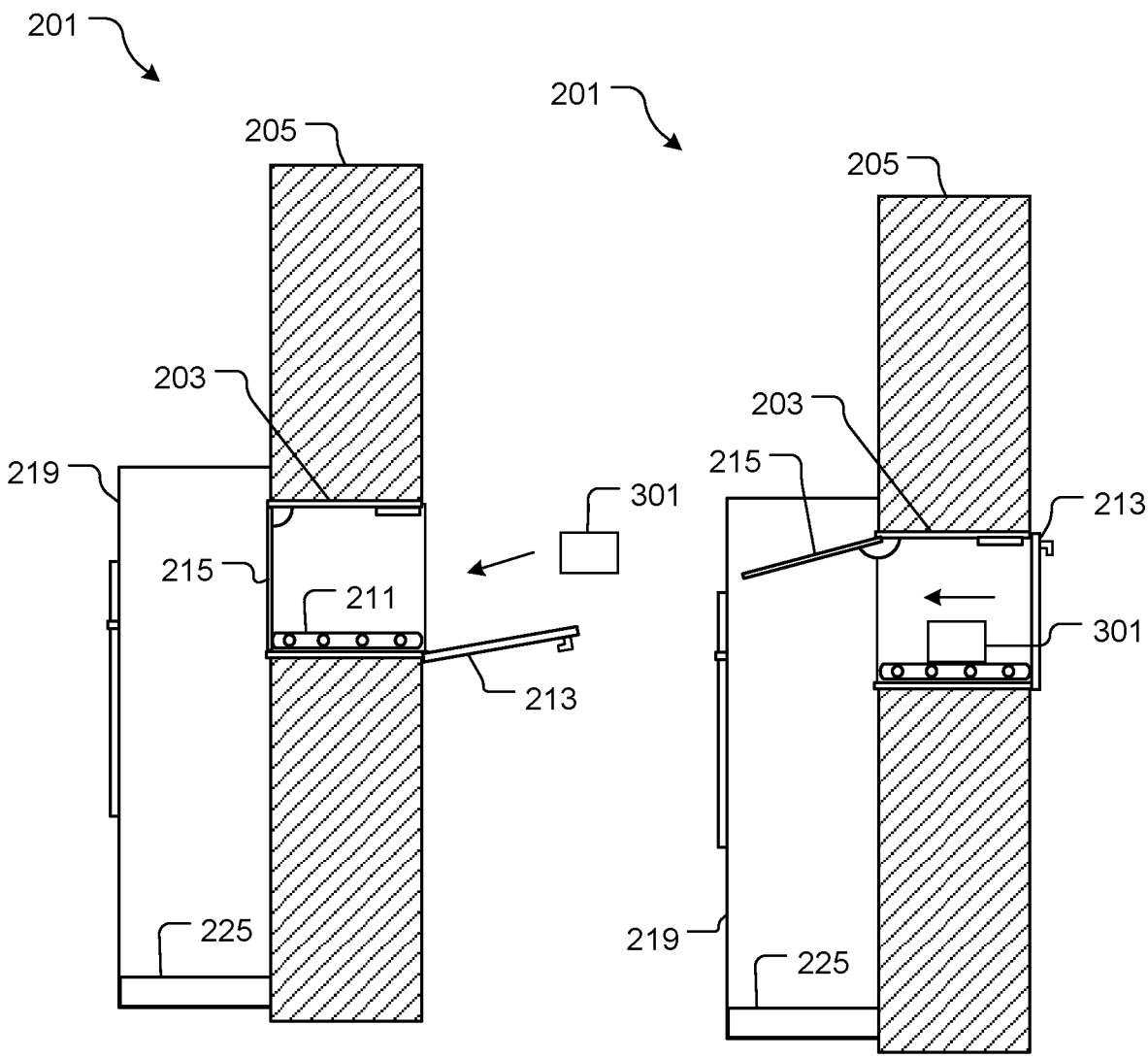
FIGS. 3A-3C depict the system of FIG. 2 in use.
Figure 3C:
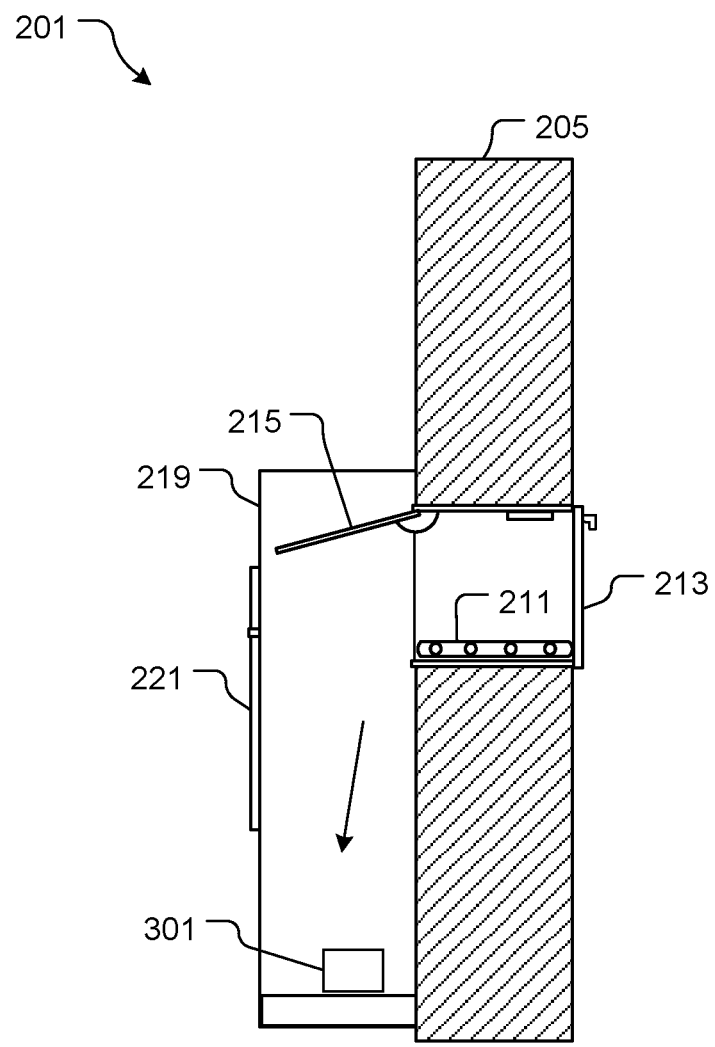

In FIGS. 3A-3C, the delivery of a package 301 is depicted. As door 213 opens, door 215 remains closed for security. Package 301 is placed inside shoot 203 and scanned, wherein conveyer belt 211 transfers package through open door 215 and into cabinet 219. The padding 225 protects package 301 as it hits the bottom of the cabinet. The package can then be removed by the user via door 221.

It should be appreciated that one of the unique features believed characteristic of the present application is the shoot having a first and second door and extending through a thickness of a wall of a building. It should be appreciated that this feature aids in preventing theft and damage to packages, as well as overall security to the building.

Figure 4:
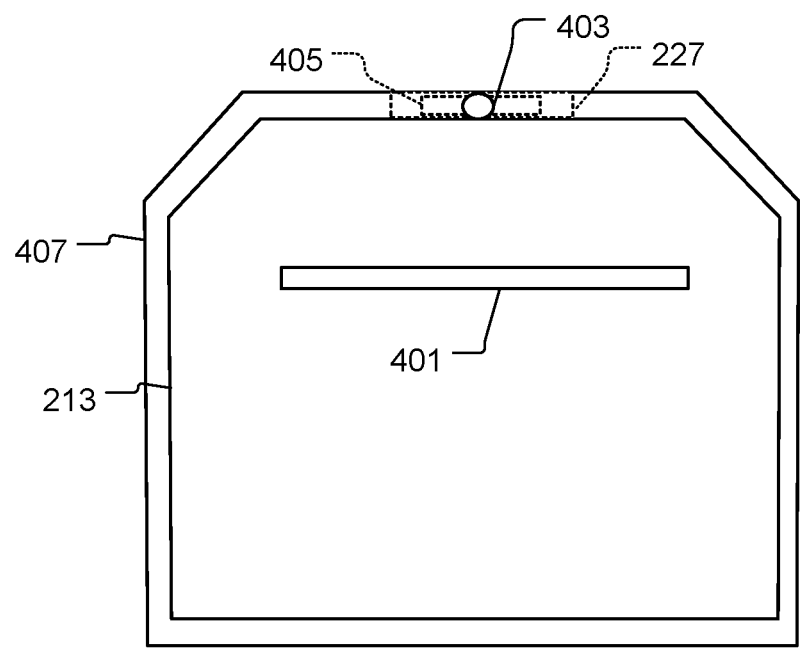
FIG. 4 is a front view of a first door associated with the system of FIG. 2.

In FIG. 4, a front view of door 213 is shown. It should be appreciated that the shape and size of door 213 can vary. In the preferred embodiment, door 213 can include a slot 401 wherein mail and the like can be inserted. In addition, electronic control system 227 can include one or both of a camera 403 and a scanner 405, wherein the camera 403 takes images of deliveries and scanner 405 is configured to scan barcodes and the like associated with packages. In the preferred embodiment, the control system and scanner are embedded above and behind the door, while the camera is mounted to a frame 407 of door 213, however, alternative embodiments contemplate mounting the various features in other locations. Electronic control system 227 further includes a transmitter configured to communicate the images and scanned information to the electronic device for remote monitoring by the user.

Figure 5:
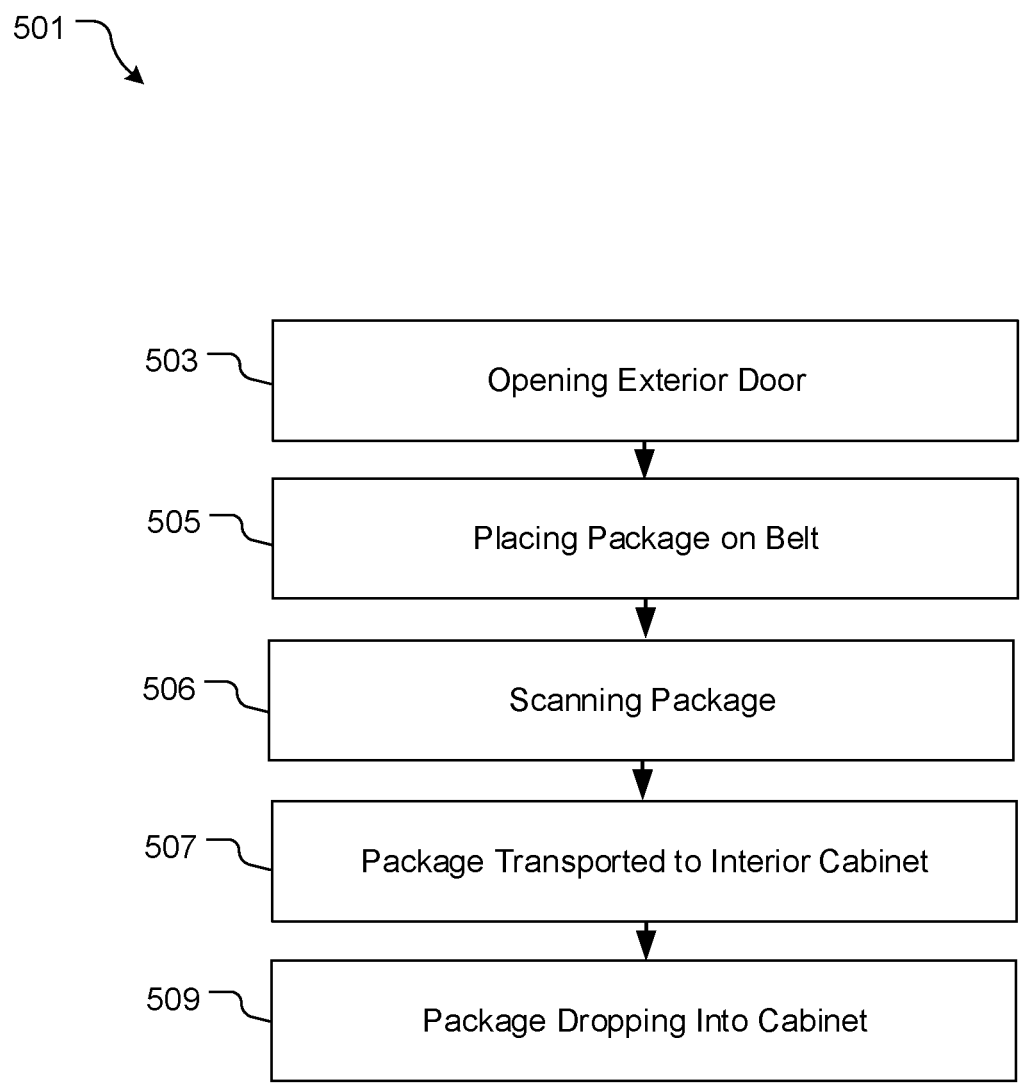
FIG. 5 is a flowchart of the method of use of the system of FIG. 2.

In FIG. 5, a flowchart 501 depicts a method of use of system 201. During use, the exterior door is opened, wherein delivery personnel places a package within the shoot and on the conveyer belt, as shown with boxes 503, 505. It should be understood that in some methods, the delivery personnel merely places mail through a slot in the exterior door. The package or mail is then scanned and transported to the interior cabinet via the conveyer belt and the opening of the interior door, as shown with boxes 506, 507. The package further drops into the cabinet, as shown with box 509.

It should be appreciated that system 201 could further be used for friends, family, and neighbors dropping off packages, gifts, or other items.

Figure 6:
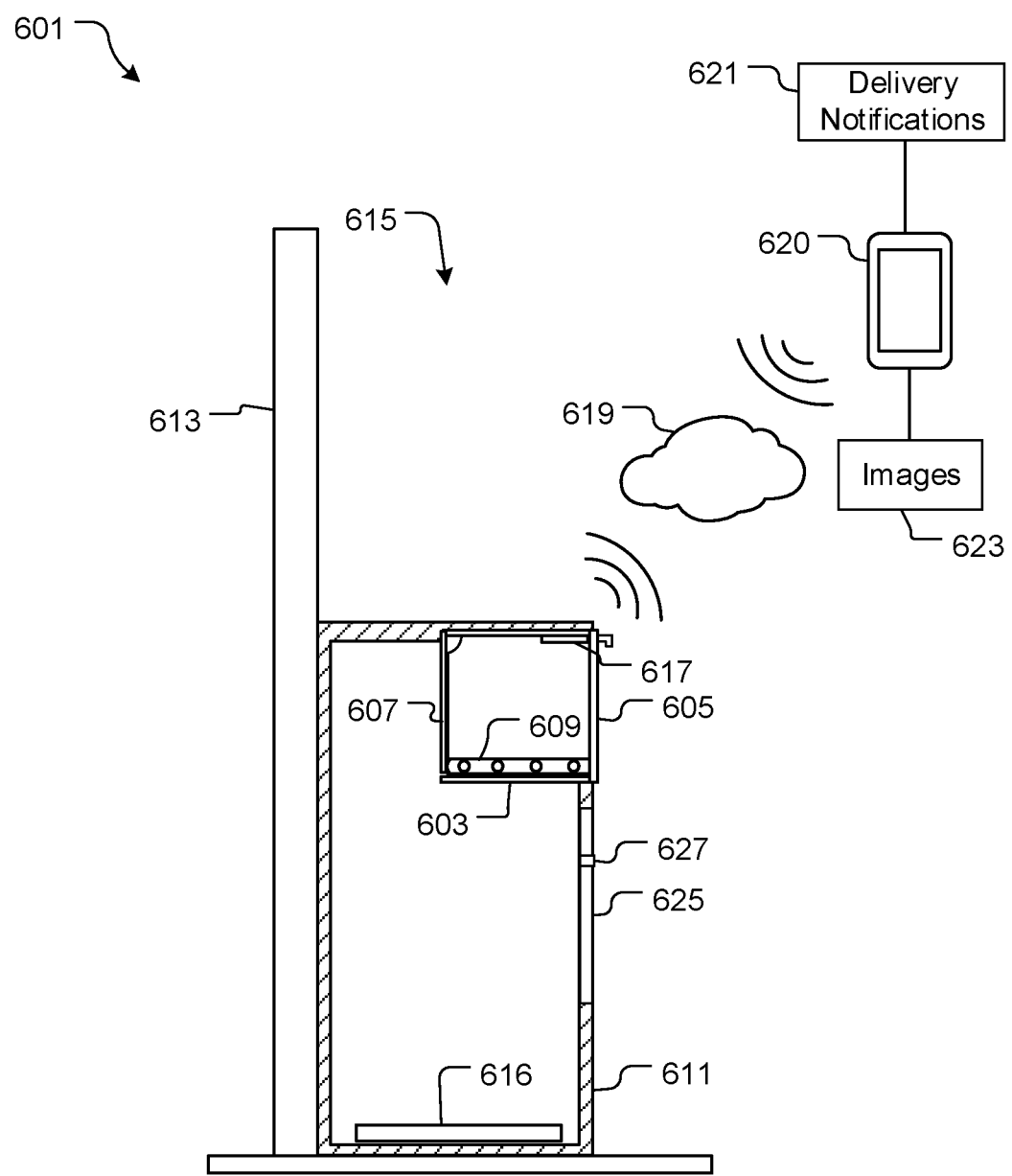
FIG. 6 is a side view of an alternative embodiment of a package receiving system in accordance with the present application.

In FIG. 6, a side view depicts an alternative embodiment of a package receiving system 601 in accordance with the present application. System 601 includes a delivery shoot 603 having the same form and function as the shoot 203, including a first door 605 and a second door 607, wherein a conveyer belt 609 is positioned therein to transport a package. In this embodiment, shoot 603 is positioned through a thickness of a wall of an exterior cabinet 611, the exterior cabinet 611 configured to be secured and anchored to a building wall 613 on the exterior 615 of the wall and can have a pad 616 positioned at the bottom of the cabinet. It should be appreciated that this system provides the same functionality as system 201, but is suitable for existing buildings wherein the user does not want to drastically alter the structure of their building.

System 601 further includes an electronic control system 617 configured to communicate wirelessly through a network 619 with an electronic device 620, thereby providing a means for a user to receive delivery notifications 621 and/or images 623.

During use of system 601, the delivery personnel places a package or mail within shoot 603, wherein the package is scanned and then drops into the cabinet. The package/mail can then be retrieved via an access door 625 having a lock 627 to prevent damage and theft.

Figure 7:
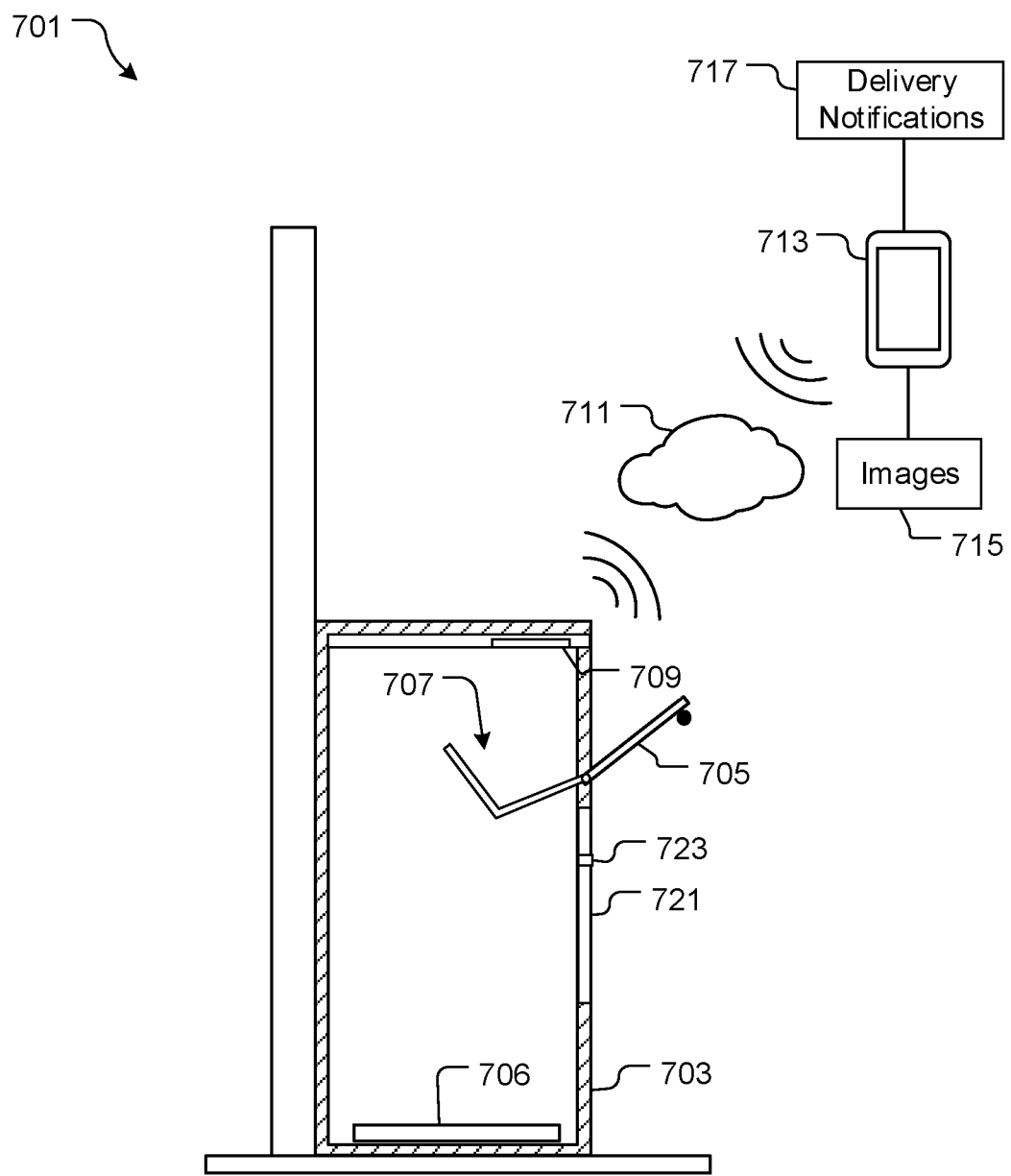
FIG. 7 is a side view of an alternative embodiment of a package receiving system in accordance with the present application.

In FIG. 7, another alternative embodiment is shown, wherein a package receiving system 701 includes an exterior cabinet 703 having a first door 705 configured to provide access to the interior of the cabinet having optional padding 706. First door 705 can provide access to a shoot 707 configured to receive a package therein to then drop the package into the cabinet, when the door 705 is in a closed position. When door 705 is open, the shoot 707 comes forward to block access to cabinet 703. System 701 further includes the features discussed in connection with system 601, including a control system 709 having one or both of a camera and a scanner included therein, wherein the scanner is configured to read a code associated with a package when the package passes underneath or near the scanner. Control system 709 being configured to wirelessly communicate through a network 711 to an electronic device 713 and thereby providing a means for a person to receive images 715 and delivery notifications 717. Cabinet 703 can further include a second door 721 with a lock 723 for providing access to delivered packages.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A package receiving system, comprising:
a shoot extending through a wall of a building from an exterior of the building to an interior of the building;
a first door positioned on the exterior of the building providing access to the shoot;
a second door positioned on the interior of the building and providing access to the interior of the building;
a conveyer belt positioned at a bottom of the shoot and configured to transport a package from the exterior to the interior;
a electronic control system having a scanner positioned within the shoot, the scanner to scan a code associated with the package; and
a cabinet positioned within the interior and in communication with the shoot;
wherein the conveyer belt transports the package into the cabinet;
wherein the electronic control system transmits a notice to an electronic device for a user to receive a notification of delivery; and
wherein the second door is configured to open to allow the package to enter into the interior.

2. The system of claim 1, wherein the cabinet further comprises:
a door having a lock and providing access to inside the cabinet.

3. The system of claim 1, wherein the cabinet further comprises:
a padded bottom surface.

4. The system of claim 1, wherein the electronic control system comprises:
a camera.

5. A method of delivering the package, comprising:
providing the system of claim 1;
opening the first door to receive access to the shoot; and
placing the package inside the shoot and on the conveyer belt;
wherein the conveyer belt transports to the package to the interior of the building.

6. The method of claim 5, further comprising:
transmitting images information via a camera associated with the electronic control system to the electronic device.

* * * * *